(12) United States Patent
Garakani et al.

(10) Patent No.: US 7,715,431 B1
(45) Date of Patent: May 11, 2010

(54) FALLBACK FOR V.42 MODEM-OVER-INTERNET-PROTOCOL (MOIP) GATEWAYS METHOD AND APPARATUS

(75) Inventors: Mehryar Khalili Garakani, Westlake Village, CA (US); Herbert M. Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1177 days.

(21) Appl. No.: 10/273,374

(22) Filed: Oct. 16, 2002

(51) Int. Cl.
H04J 3/16 (2006.01)
H04J 3/22 (2006.01)

(52) U.S. Cl. .................................................... 370/466
(58) Field of Classification Search .................. 370/466
See application file for complete search history.

(56) References Cited

U.S. PATENT DOCUMENTS

| | | | |
|---|---|---|---|
| 4,903,260 A | 2/1990 | Boettle et al. | |
| 5,155,484 A * | 10/1992 | Chambers, IV | 341/55 |
| 5,163,055 A * | 11/1992 | Lee et al. | 714/748 |
| 5,347,516 A | 9/1994 | Yoshida | |
| 5,379,327 A * | 1/1995 | Sharma et al. | 375/377 |
| 5,381,407 A * | 1/1995 | Chao | 370/233 |
| 5,884,870 A * | 3/1999 | Maffre et al. | 244/182 |
| 5,958,024 A * | 9/1999 | Typaldos et al. | 710/26 |
| 6,377,570 B1 | 4/2002 | Vaziri et al. | 370/352 |
| 6,560,725 B1 * | 5/2003 | Longwell et al. | 714/54 |
| 6,614,845 B1 * | 9/2003 | Azadegan | 375/240.13 |
| 6,671,272 B2 | 12/2003 | Vaziri et al. | 370/352 |
| 6,865,220 B2 * | 3/2005 | Abrishami | 375/220 |
| 6,882,711 B1 * | 4/2005 | Nicol | 379/93.33 |
| 6,965,600 B2 * | 11/2005 | George | 370/392 |
| 7,075,979 B2 * | 7/2006 | Beadle et al. | 375/222 |
| 7,113,501 B2 * | 9/2006 | Garakani et al. | 370/352 |

(Continued)

FOREIGN PATENT DOCUMENTS

CA 2265776 4/1998

(Continued)

OTHER PUBLICATIONS

White Paper—Modem Over IP—Mindspeed Technologies—Apr. 2002.*

(Continued)

*Primary Examiner*—Salman Ahmed
*Assistant Examiner*—Blanche Wong
(74) *Attorney, Agent, or Firm*—Stolowitz Ford Cowger LLP

(57) ABSTRACT

The invented method and apparatus include a transport mechanism for transporting a non-V.42, e.g. a V.14 or synchronous modem, data stream in a modem relay connection utilizing the standard V.14 raw or character mode, the transport mechanism including a rate-control mechanism for substantially speed-matching the end-to-end flow of data. Preferably, speed-matching is based on a calculated effective data rate—which takes into account various character and link framing and compression overhead—rather than a physical layer rate. Rate-control methods include the use of receive not ready (RNR) to control data flow in a V.42 leg of a mixed non-V.42 and V.42 connection, a single leaky bucket technique and effective data rate-matching. Also proposed is a lossless compression mechanism (e.g. run-length encoding (RLE)) for encoding a data bit stream into modem relay packets. An auto-detection method on the non-V.42 leg in the character mode is proposed for determining character size to enable extraction and packetizing thereof for modem relay transmission.

25 Claims, 4 Drawing Sheets

U.S. PATENT DOCUMENTS

| | | | | |
|---|---|---|---|---|
| 7,126,711 | B2 * | 10/2006 | Fruth | 358/1.15 |
| 7,133,934 | B1 * | 11/2006 | Rossello et al. | 709/249 |
| 2003/0031181 | A1 * | 2/2003 | Rowley et al. | 370/394 |
| 2003/0095544 | A1 * | 5/2003 | Chu | 370/352 |
| 2003/0123466 | A1 * | 7/2003 | Somekh et al. | 370/401 |
| 2004/0218739 | A1 * | 11/2004 | Nicol | 379/93.33 |

FOREIGN PATENT DOCUMENTS

| | | |
|---|---|---|
| EP | 0 732 835 | 9/1996 |
| EP | 1 014 632 | 6/2000 |
| GB | 2283154 | 4/1995 |
| WO | WO 90/12466 | 10/1990 |
| WO | WO 95/25407 | 9/1995 |
| WO | WO 95/31060 | 11/1995 |

OTHER PUBLICATIONS

Henning Sanneck—Packet Loss Recovery and Control for Voice Transmission over the Internet—Oct. 2000.*

ITU V.42; Error-Correcting Procedures for DECS Using Asynchronous-to-Synchronous Conversion; 59 pages; Apr. 2002.

Draft ITU-T Recommendation H.323 entitled "Visual Telephone Systems and Equipment for Local Area Networks which Provide a Non-Guaranteed Quality of Service", SG15 Plenary May 28, 1996.

Nakamura Y. et al.: "On a Hybrid Network System of Circuit Switching and Packet Switching", *The Transactions of the IECE of Japan*, vol. E 65, No. 6, Abstracts.

Low C. et al.: "WEBIN—an Architecture for Fast Deployment of In-Based Personal Services", Workshop Record, Intelligent Network, Freedom and Flexinbility: Realising the Promise of Intelligent Network Services, p. 1-12, Apr. 21, 1996, XP002043670.

Babbage R. et al.: "Internet Phone—Changing the Telephony Paradigm?", BT Technical Journal, vol. 15, No. 2, Apr. 1997, p. 145-157, XP000676853.

Verified translation of EP 1014632 submitted to the United Kingdom Patent Office.

* cited by examiner

FALLBACK FOR V.42 MODEM-OVER-INTERNET-PROTOCOL (MOIP) GATEWAYS METHOD AND APPARATUS

BACKGROUND OF THE INVENTION

The present invention relates generally to modem relay network systems such as Modem over Internet Protocol (MoIP) systems. More particularly, it concerns method and apparatus for providing a fallback mode of V.14 or other synchronous modem operation in case one or more of two modem terminal devices is a non-V.42-type modem or is a V.42-type modem configured not to follow the V.42 link layer protocol.

V.42 Modem Relay gateways are used for transport of modem data over Voice over Internet Protocol (VoIP) networks. Typically, this involves three legs: Originating Telephony Leg, Terminating Telephony Leg, and an Internet Protocol (IP) Leg.

Originating Telephony Leg consists of the telephony leg between the originating modem and its associated gateway. Terminating Telephony Leg consists of the telephony leg between the answerer modem and its associated gateway. The IP Leg refers to the connection over the IP network joining the two telephony legs.

Frequently, both of the two telephony legs run the V.42 link layer protocol. This is frequently the case with dial-up Internet connections. In this case, a "V.42 modem relay gateway" would terminate the physical layer as well as V.42 error correction layer over the telephony legs. It may additionally terminate the compression layer.

Information that a gateway receives on its telephony leg from the client modem on its telephony leg can then be sent over a reliable IP transport protocol to the remote gateway, which would then forward this information to its associated client modem.

The procedure for two modems (e.g. a client modem and its associated gateway modem) to negotiate V.42 link layer is done shortly after physical layer bring-up, using ADP/ODP sequences exchanged between the two modems. However, either of the two modems may be configured to not use any link layer protocol. For example, one side may not generate the standard ADP or ODP patterns, whether by manual intervention or otherwise. In this case, the V.42 specification has defined a fallback mechanism to a no-error-correction mode of operation, based on the V.14 specification.

The V.14 mode of operation involves transfer of data using a "Start/Stop" delimited character format. A typical application is gaming, which may run the PPP protocol straight over non-error-corrected V.14 modem links. The V.14 mode is typically used in gaming due to its reduced latency, since information is transmitted in characters and hence there is no packetization delay. Data errors are acceptable in such an application whereas latency, i.e. transmission or turn-around delays, is not.

The case where modem relay techniques support the non-V.42 mode of operation (which is mandatory as per the V.42 specification) is significantly different from the case where both telephony legs use V.42 link layer protocol. The present invention provides a modem relay approach to support a non-V.42 mode of MoIP operation.

SUMMARY

The invented method and apparatus include a transport mechanism for transporting a non-V.42, e.g. a V.14 or synchronous modem, data stream in a modem relay connection utilizing the standard V.14 raw or character mode, the transport mechanism including a rate-control mechanism for substantially speed-matching the end-to-end flow of data. Preferably, speed-matching is based on a calculated effective data rate—which takes into account various character and link framing and compression overhead—rather than a physical layer rate. Rate-control methods include the use of receive not ready (RNR) to control data flow in a V.42 leg of a mixed non-V.42 and V.42 connection, a single leaky bucket technique and effective data rate-matching. Also proposed is a lossless compression mechanism (e.g. run-length encoding (RLE)) for encoding a data bit stream into modem relay packets. An auto-detection method on the non-V.42 leg in the character mode is proposed for determining character size to enable extraction and packetizing thereof for modem relay transmission.

DETAILED DESCRIPTION OF THE EMBODIMENTS

Figure 1:
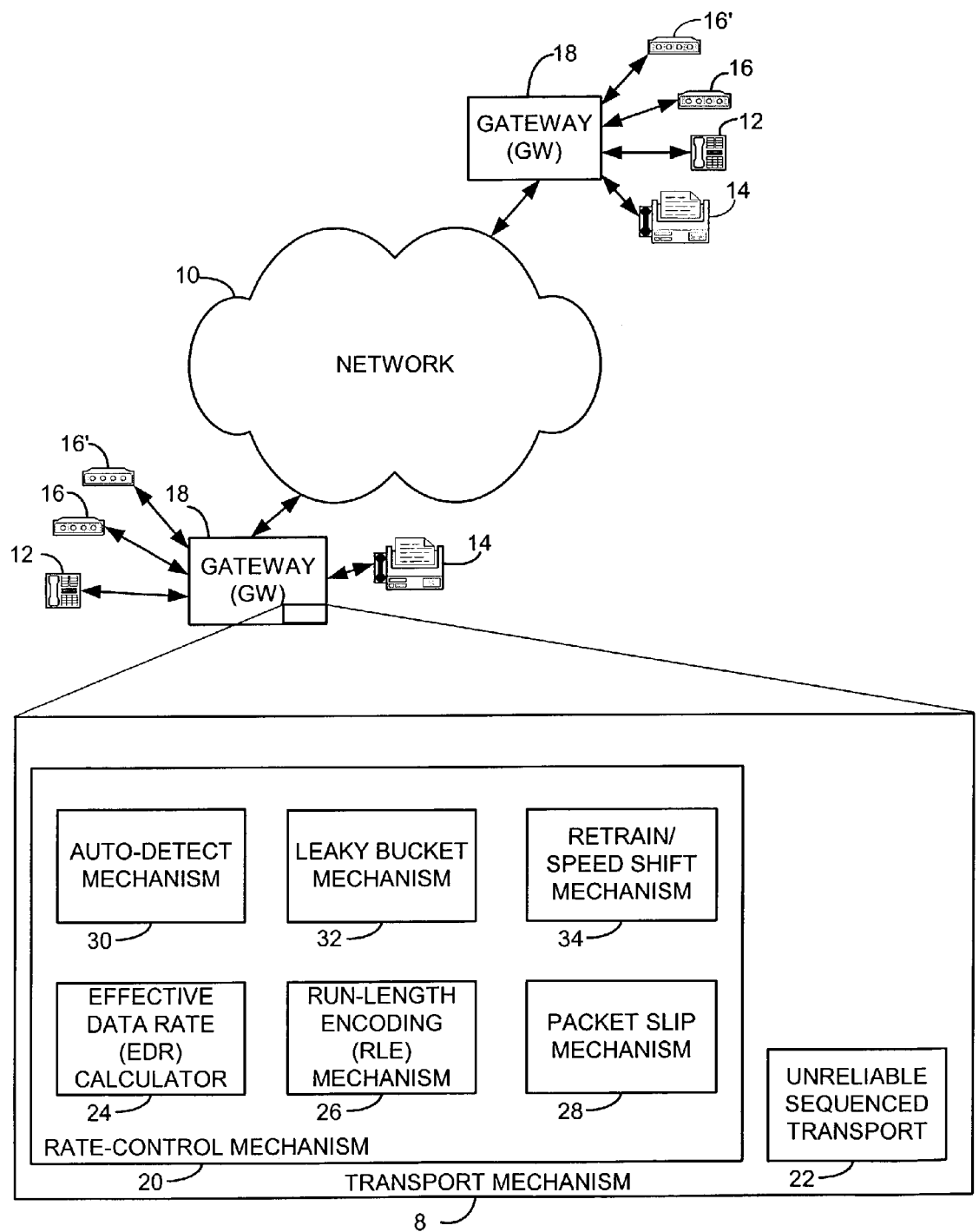
FIG. 1 is a system block diagram illustrating a MoIP employing the invention in accordance with a preferred embodiment.

FIG. 1 is a system block diagram of the invented apparatus within a MoIP network connection. FIG. 1 illustrates the invented apparatus 8 coupled with a network 10 operating with respect to voice traffic thereon in accordance with a voice and data packet protocol such as a Voice-Modem over Internet (MoIP) protocol. Network 10 typically includes one or more telephone handsets 12, one or more fax machines 14 and one or more low-speed modems (or modem terminal devices) 16 representing different traffic demands on network 10 due to their diverse bandwidth requirements. Faxes 14 and low-speed modems 16 often share telephone numbers with telephone handsets 12 to provide facsimile, e-mail and Internet service to users/clients. High-speed modems (or modem terminal devices) 16' having data rates of 32β-56 kbits/second (kbps) or higher are typically provided. Modems 16 and 16' are the type of low-speed and high-speed modems with which the invention finds particular utility. For example, modem 16 may be a V.14-type modem and modem 16' may be a v.42-type modem.

Handsets 12 communicating voice typically require bit rates of approximately 8-64 kbps over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, MoIP channels using RTP or other low-latency protocols represent an unreliable transport for high-speed signaling between high-speed modems 16'.

Conventionally, in a MoIP network 10, high-speed modems 16' would have negotiated an end-to-end physical layer and then a V.42 link layer using ADP/ODP sequences exchanged between, for example, a client modem and its associated gateway modem. However, it is possible instead for one or both V.42-type modems 16' to refuse this exchange, requiring a fallback to some other mode of operation. It is also possible that one or both V.14-type or other synchronous modems 16 have negotiated an end-to-end error correction layer for use in low-latency applications such as gaming.

That is the context for advantageous application of the present invention.

FIG. 1 illustrates the invented apparatus as including a transport mechanism 8 residing within a gateway GW. It will be understood that transport mechanism 8 may reside within any number of gateways GW coupled with network 10. Transport mechanism 8 includes a rate-control mechanism 20 and an unreliable sequenced transport, e.g. unreliable sequenced Transport 22. Preferably, rate-control mechanism includes one or more of the functional blocks shown in FIG. 1, including an effective data rate (EDR) calculator 24, a run-length encoding (RLE) mechanism 26, a packet slip mechanism 28, a character size auto-detect mechanism 30, a leaky bucket procedure or mechanism 32 and a retrain/speed shift mechanism 34.

These functional blocks will be described in some detail below in terms of the various procedures and methods used to achieve rate control of data within a bit stream in a modem relay connection. Those of skill in the art will be appreciate that the calculator and other mechanisms preferably are implemented in software, firmware, hardware or any suitable combination thereof, within the spirit and scope of the invention. Those of skill in the art also will appreciate that one or more may be invoked to achieve a desired level of performance and flexibility, as by subroutine or function calls from the gateway-resident application program.

There are two types of non-V.42 configurations: "Symmetric Configuration" and "Hybrid Configuration". The latter may be referred to herein as an asymmetric modem relay configuration or connection.

Symmetric non-V.42 Configuration occurs when both telephony links are in the non-V.42 operational mode. Hybrid Configuration occurs when one side is in non-V.42 mode and the other leg is running V.42.

The two described scenarios result in different set of issues. Hence, different techniques need to be considered. However, there are some similarities.

General considerations will be described below before presenting specific techniques to support Symmetric and Hybrid non-V.42 configurations.

Rate-Matching Considerations: In both configurations, rate-matching techniques must be used. This is because in neither configuration can end-to-end flow control be maintained (e.g. since no flow control procedures exist across the DCE interfaces when in V.14 mode).

Transport Considerations: In order to be able to enforce matching of data flow across the two legs, a "sequenced unreliable" transport layer (e.g. RTP) is proposed. A "reliable" transport layer (e.g. a TCP) may not be an appropriate transport mechanism for this application. This is because potentially large delays may result from retransmits, which can create a bottleneck in data transport.

Furthermore, applications that use V.14 (having no error correction layer) are tolerant of some level of error, hence a fully reliable protocol need not be used. An "un-sequenced unreliable" transport (e.g. a standard UDP) also is not appropriate, since out-of-sequence delivery of data across the IP network is not acceptable in modem applications.

Those of skill in the art will appreciate the general considerations described above. Specific approaches for each type of non-V.42 operation follow.

Symmetric Non-V.42 Operation:

Two different data transfer modes can be used to support Symmetric Non-V.42 operation: Raw mode and Character mode. In Raw mode, the bit-stream (or equivalent data) from each gateway is packed into IP packets and sent to its peer, at which time the bit stream can be forwarded to the peer's client modem.

In Character mode, the Start/Stop formatted characters are deframed. The characters can then be packetized and transmitted to the peer. This requires knowledge of character size.

Raw mode is the appropriate mechanism to use when character size is unknown. When character size is known, Character mode offers a significant advantage over Raw mode in reducing traffic across the IP network. This is because mark bits representing a line idle condition are not transported. The Character sizes defined in V.14 are between eight and eleven bits, which correspond to six to nine data bits embedded between a start and a stop bit. However, the ten bit character size is the most commonly used format.

If support for optional character sizes (i.e., eight, nine, or eleven bit character size) also is required (in addition to the mandated ten bit character size), the gateways may use so-called "auto-detect" procedures on their Data Circuit-terminating Equipment (DCE) interface to determine character size. However, such auto-detect procedures may or may not succeed, and the likelihood of their success depends upon the nature and amount of data that is available to the auto-detect procedures. Statistical techniques are proposed to yield a high probability of character size auto-detect success. These will be described in some detail below.

Auto-Detect Procedures:

In order to extract a character from a data bit stream, it is necessary for the originating gateway to discover how the characters are framed. Typically, there is a start bit and one or more stop bits and data therebetween of length between seven and ten bits. Thus, plural 'windows' or 'masks' are defined to be of varying widths and at each bit time, a nine bit, ten bit, eleven bit, twelve bit and thirteen bit sequence is compared to the mask (the data field of variable width being a don't care and thus masked out) that includes the proper polarity and candidate position of start and stop bits.

Using statistical theory, then, various hypotheses are defined and tested as more and more data bits in the data stream are advanced through the windows and compared with the masks. Those of skill in the art will appreciate that hypotheses successively are eliminated as they are invalidated until a most likely hypothesis surviving invalidation emerges as the most likely scenario. If at some point two hypotheses remain for a period of time prohibitive of resolution as between them, then the more likely is simply chosen on the basis of the difficulty level of invalidating it. For example, if the eighth bit looks like a parity bit, but it is not clear whether it is data or parity, then because a seven data bit/1 parity bit (D7/P1) character format is more easily invalidated than an eight data bit/no parity bit (D8) format, it may relatively safely be assumed that the character format is D7/P1.

The statistical approach must establish acceptable violation levels without certainty, since the V.14 legs are not error corrected. Thus statistical weighting-based decision-making logic is used to determine the most likely character size hypothesis rather than simpler black-and-white decision-making logic. This novel approach, along with the examination of lots of data, ensures that corrupted data does not result in invalidation of a hypothesis that is true.

Figure 2:
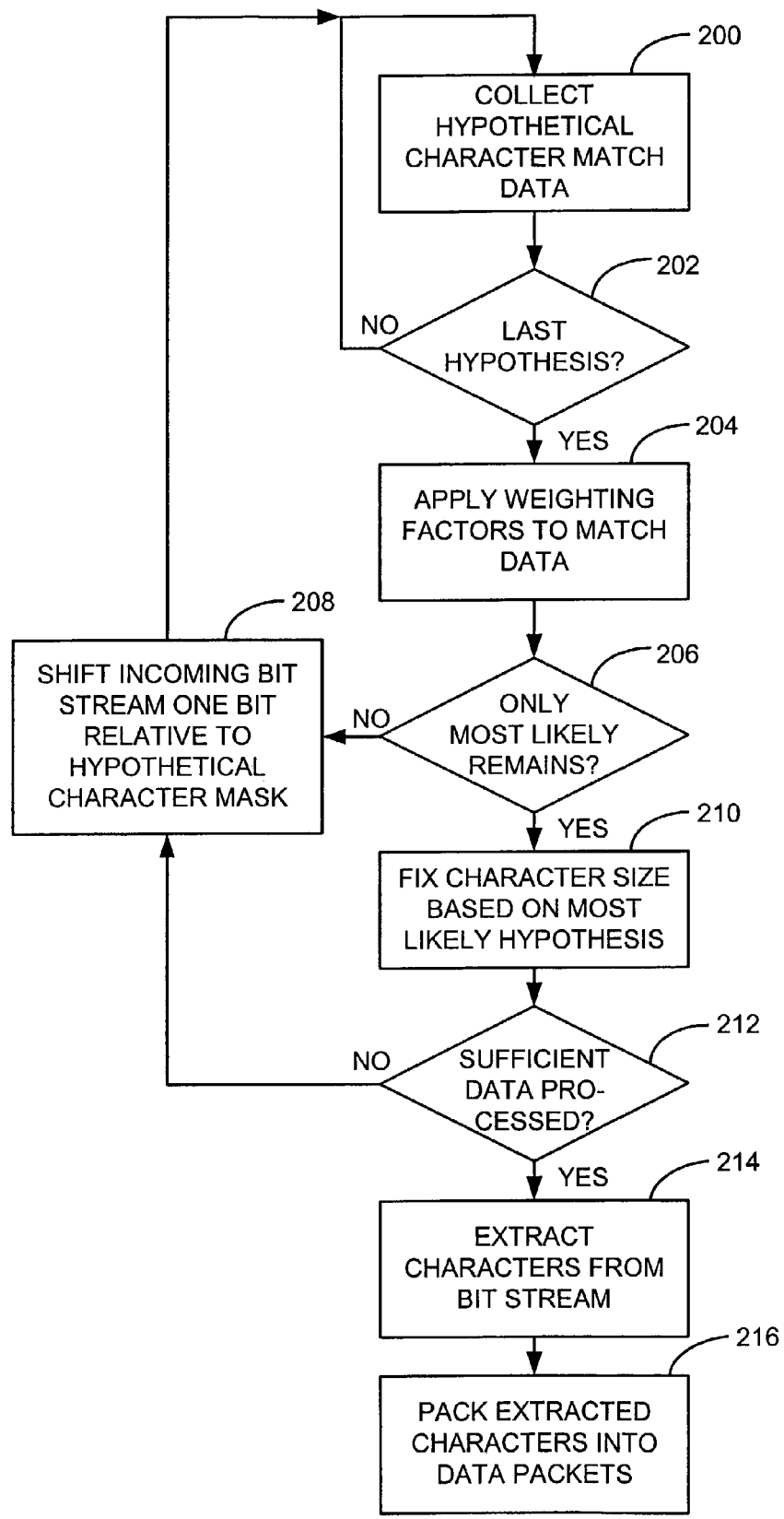
FIG. 2 is a flowchart of the invented auto-detect technique for determining the size of a character in a DCE-DCE bit stream.

Such hypotheses, windows, masks, comparisons, trial counters, statistical weighting and decision-making logic are readily implemented in software, firmware, hardware or a combination thereof at the appropriate (originating) gateway. FIG. 2 is a flowchart illustrating such auto-detection decision-making method, which forms a part of a more general character-packetizing method, in accordance with one proposed embodiment of the invention. Briefly, at 200 hypothetical character match data are collected by analyzing the bit stream and comparing it to variable length masks representing the various hypothetical characters, e.g. D6/P1, D7/P1, D8, one or two stop bits, odd or even parity, etc. Such is repeated until the last hypothetical character, or hypothesis, has been compared and the results of such comparison collected, as by a software, firmware or hardware counter, at 202. At 204, weighting factors representing statistical probabilities of data errors and more and less likely character size hypotheses are applied to the collected match data.

At 206 and 208, the incoming bit stream is shifted one bit relative to the hypothetical character masks until only the most likely hypothetical character size remains. At 210, when most unlikely hypothetical character sizes have been eliminated, or substantially eliminated, and determined to be less likely than a remaining hypothetical character size, the character size is fixed based on the most likely remaining hypothetical character size. To ensure that an incorrect hypothesis is rejected, or a correct hypothesis embraced, a determination is made at 212 whether sufficient data to ensure that data corruption on an un-error-corrected link has not also corrupted the decision-making process has been processed. When it is determined that enough data has been processed, the last fixed character size is used at 214 to extract characters from the DCE-DCE bit stream. Finally, at 216, the extracted characters are packed into data packets, or packetized, to efficiently perform character mode data transmission.

The illustrated method is only one way of realizing auto-detection of character size for purposes of extraction, packing and packetizing, and others are contemplated. Alternatively, for example, more strict rules may be enforced in such MoIP connections that require non-V.42-type modems to use only seven or eight bit data plus parity (D7/P1 or D8/P1). Such constraining rules render auto-detection simpler and more robust, but provide less flexibility. Any and all suitable alternatives to auto-detection are within the spirit and scope of the invention.

For the Symmetric case, after switching over to modem relay state, and after establishing a "sequenced unreliable" transport, the following procedure is used:

A) The gateways inform each other of their initial physical layer speed (rx and tx) on their respective telephony legs (rx and tx represent the viewpoint of the gateway modem, i.e., rx refers to direction of flow towards a gateway, and tx refers to direction of flow towards a client modem). If the rx speed on a gateway is larger than the tx speed on a peer gateway, the gateway reduces its rx speed through rate negotiation so that it will be equal or lower than the tx speed on the peer gateway. This assumes asymmetrical rates can be used at the physical layer.

In case neither gateway supports asymmetrical rates, the objective of this step can be achieved by setting all rx and tx rates the same across the two gateways (i.e., rx gw 1=rx gw 2=tx gw 1=tx gw 2).

In case one gateway supports asymmetrical physical layer rates (rx, tx), but the other gateway supports symmetrical physical layer rate (R), the following relationship is enforced through rate negotiation:

$$rx<=R<=tx.$$

B) Step A above initially establishes the appropriate physical layer rates. Subsequently, and for the duration of the modem session, in the case of any further rate renegotiations, the gateways may perform rate adjustments again according to relationships described in Step A. This requires that each gateway let its peer know of any rate changes on its telephony interface. This can be accomplished through inter-gateway messaging.

C) Depending on the mode (Raw or Character mode), the gateway packetizes the input and sends the same to its peer. The packet is sent to the peer after a certain number of bits or characters are accumulated or after a certain amount of time has elapsed.

Lossless compression of data (e.g. run-length encoding (RLE)) may be used, in accordance with the invention, in the symmetric non-V.42 operation to decrease bandwidth over the IP network. Those of skill in the art will appreciate that conventional run-length encoding by which, for example, a "run" of consecutive, uninterrupted "1"s or "0"s is encoded as a single "1" or "0" prefixed or post fixed with a numeral or other representation of the number of such "1"s or "0"s in the run is useful to compact highly repetitive data, thereby to decrease bandwidth over the network.

Hybrid Non-V.42 Operation:

The Hybrid Non-V.42 case can be supported only in Character mode. This is because the V.42 leg uses an eight-bit character format (V.42 Annex B), and there is no way to couple a bit stream into a character stream without actually parsing the characters. For the Hybrid case, the Start/Stop formatted characters are deframed. The characters are packetized and transmitted to the peer. Depending on the character format used (defined in V.42 Annex B), there may have to be some conversion performed on Stop/Start characters to be able to transmit them on the V.42 interface.

For example, for the character formats that use two stop bits, the extra stop bit appears as a binary "1" on an asynchronous interface and as a binary "0" when on a V.42 interface.

For the Hybrid case, after switching over to modem relay state, and after establishing a "sequenced unreliable" transport, the following procedure is applied:

The gateways inform each other of their initial physical layer speed (rx and tx) on their respective telephony legs (again, rx and tx represent the viewpoint of the gateway modem, i.e. rx refers to direction of flow towards a gateway, and tx refers to direction of flow towards a client modem). The rate procedures in this case cannot rely simply on physical layer rates, and instead must rely on a so-called "effective data rate" or EDR. This is because the overhead on a V.42 link is substantially lower than that on a V.14 link, since V.14 link uses two extra bits (one start and one stop bits per character). This is true when there is limited or no impairments on telephony links. However, in case of significant telephony impairments, there would be error recovery under the V.42 protocol, which may substantially reduce the throughput of the V.42 side.

The use of effective data rate (EDR, also referred to herein as effective data signaling rate) to render the two legs optimally compatible will be referred to herein as effective rate control. Those of skill in the art will appreciate that effective data signaling rate is the data signaling rate in bits per second (bps) with all format and frame information removed from the data stream, e.g. start, stop, parity bits; protocol headers; cyclic redundancy checks (CRCs); high-level data link control (HDLC) flags; preambles, post-ambles, etc. Effective data signaling rate is always less than or equal to the data signaling rate of the input data stream.

In general the following rate-matching/control rules is believed to allow satisfactory operation:

A1) The physical layer receive rate on the gateway running V.14 on its DCE interface should be set such that the received effective data rate for the gateway is equal to or lower than the V.42 side transmitted effective data rate. In, circumstances where the V.42 leg may be expected to experience significant impairment, it makes sense to introduce an effective data rate differential by introducing a large differential (i.e. by using a lower received effective data rate for the gateway running V.14 on its DCE).

A2) In the reverse direction (i.e., data flow from the gateway running V.42 towards the gateway running V.14), no physical layer rate constraints need to be applied. This is because the effective data rate can be controlled by the gateway, since the V.42 link offers flow control (e.g. a gateway can send its client V.42 Receive Not Ready (RNR) to flow-control data when needed). However, the suggested procedure for the gateway with the V.42 link would be to execute a conventional so-called "single leaky bucket" procedure to decide when to generate RNR. The single leaky bucket is set up with a leak equal to the effective data rate on the tx direction on the peer gateway. The bucket is filled at the effective data rate on the rx direction of the gateway running the V.42 link. The size of the leaky bucket must be smaller than the modem data storage capacity of the dejitter buffer used in the system between the two gateways. When the volume of modem data in the bucket exceeds a certain threshold, the gateway generates a V.42 RNR to shut down its client modem. Subsequently, when the amount of data remaining in the bucket goes below an appropriate threshold, the gateway signals V.42 Receive Ready (RR) to its client, thereby to resume data flow.

B) Step A above initially establishes the appropriate physical layer rates. Subsequently, during the modem session, in case there are any further rate renegotiations, the gateways may need to perform rate adjustments or to generate RR and RNR according to relationships described in Step A. This requires each gateway to let its peer know of any rate changes on its telephony interface. This can be accomplished through inter-gateway messaging.

C) During the data transfer phase, the gateway packetizes the input Start/Stop or eight bit characters and sends the packetized data to its peer. The packet is sent to the peer after a certain number of characters are accumulated or after a certain amount of time has elapsed.

Packet Slip Procedure:

In the case of telephony impairments on the V.42 link, the throughput of the link may be degraded such that it cannot cope with the incoming data flow from the peer gateway. This, despite imposition of effective rate control by which the V.42 and V.14 links are rate-matched. Because of telephony impairments, the V.42 state machine may go into a timer recovery state. It is acceptable to lose some data in this case, but in order for the V.42 gateway not to fall significantly behind, it is required to drop all queued information received from the remote peer. In addition, in case of V.42 retransmits, the gateway may 'spoof' the packet content with the newly arrived data without changing the NS of the packet being retransmitted. For example, consider a sequence of seven packets numbered 1, 2, 3, 4, 5, 6 and 7.

The packets are sent on V.42 link from the gateway towards its client modem. Assume packet 1 arrives, but packet 2 is lost. The transmitter continues to transmit packet 3 and 4, but at that point it goes to timer recovery condition. By the time the V.42 process determines that packet 2 was lost, all packets through packet 7 have arrived from the remote gateway. The invented method uses a so-called "packet slip procedure" on the V.42 DCE, which may be illustrated as follows: Instead of retransmitting packet 2, the MoIP gateway drops packets 2 through 6, and instead sends out packet 7, but with NS equal to two. Thus, the invented packet slip procedure—invoked upon detection at the data-transmitting gateway of a data packet loss—involves transmitting a later one of serial data packets within a sequence instead of the immediately succeeding one, which was indicated as having been lost. Those of skill in the art will appreciate that, while the loss of data is permissible (because high-level applications typically are error-tolerant), the accumulated delay that would otherwise result from data retransmission is highly undesirable.

In this way, the receiving gateway will not fall behind the transmitting gateway and thus data flow can be maintained in accordance with the previously imposed or defined rate control structure.

Retrain/Speed Shifts:

During these operations, one link may be temporarily unavailable, which could likely result in loss of data during retrain and speed shifts. If the link that has gone into retrain/speed shift is the V.42 link, then during retrain/speed shift all data arriving from the peer gateway should be discarded.

Figure 3:
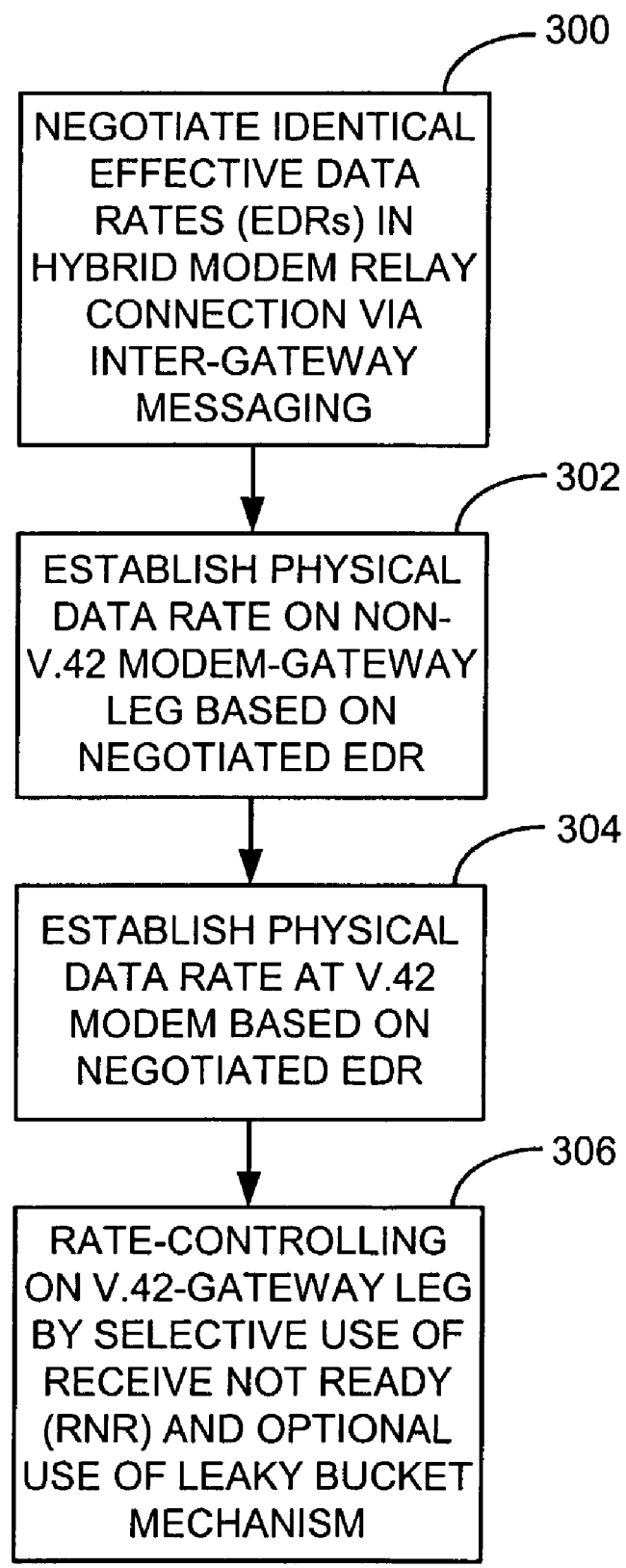
FIG. 3 is a flowchart of a hybrid modem relay connection rate-control method in accordance with a preferred embodiment of the invention.

FIG. 3 is a flowchart illustrating a method of the invention by which a hybrid modem relay connection may be effectively rate controlled. At 300, identical EDRs are negotiated via inter-gateway messaging. Such typically involves calculations based on character format, header overhead, compression overhead, etc. that in general tend to reduce bandwidth due to inefficiency below the raw physical data rate. At 302, a physical data rate compatible with the negotiated EDR is established on the non-V.42 modem-gateway leg. At 304, a physical data rate compatible with the negotiated EDR is established on the V.42 modem-gateway leg. These steps achieve initial EDR-based speed matching for end-to-end data matching. Optionally thereafter, at 306, rate control of the V.42 gateway leg can be maintained by selective use of receive not ready (RNR) and optional use to control the RNRs of single leaky bucket mechanism 32 (see FIG. 1).

Figure 4:
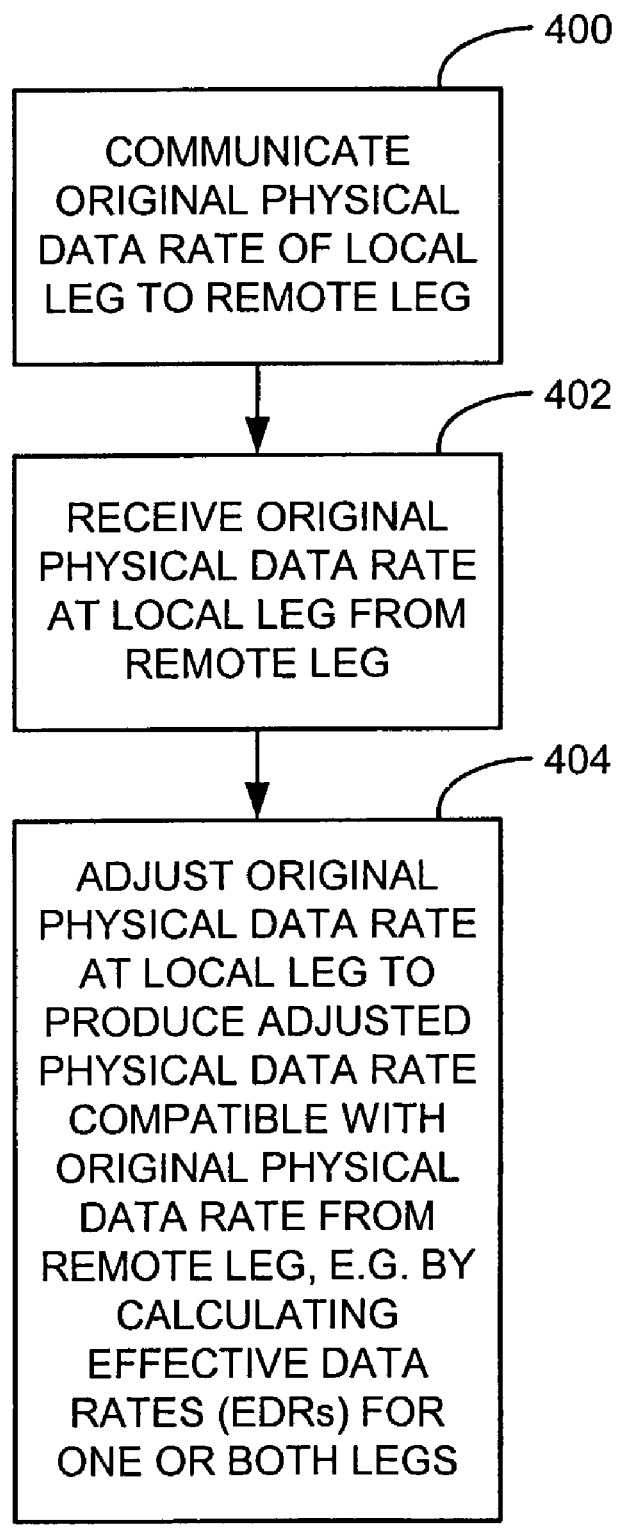
FIG. 4 is a flowchart of the hybrid modem relay connection rate-control method in accordance with another preferred embodiment of the invention.

FIG. 4 is a flowchart of a rate-control method involving a) at 400 communicating an original physical data rate of a local leg to a remote leg; b) at 402 receiving the original physical data rate at the local leg from the remote leg; and c) at 404 adjusting the original physical data rate at the local leg to produce an adjusted physical data rate that is compatible with the original physical data rate from the remote leg. Such compatibility in accordance with the invention preferably takes into account the overhead, or inefficiencies, of the particular legs as between the different modem types and their associated gateways, e.g. by calculating an EDR for both legs that is substantially identical so that end-to-end speed matching is achieved.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A modem relay connection system wherein at least one of two modem terminal devices does not use a V.42 link layer protocol to communicate data, the system comprising:
   a transport mechanism for transporting a data stream in a modem relay connection, wherein the data stream is associated with a V.14 or synchronous modem, said transport mechanism utilizing either a specified V.14 raw mode or a specified V.14 character mode;
   said transport mechanism including a sequenced unreliable transport; and
   said transport mechanism further including a rate-control mechanism for speed-matching an end-to-end flow of data within the data stream, the rate-control mechanism including:
   an effective data rate (EDR) calculator to calculate a transmit rate for a selected stream independently of predetermined non-content information including format and frame information of the selected stream; and
   a speed shift mechanism to identify a rate used for transmitting the selected stream according to an output of the EDR calculator.

2. The modem relay connection system of claim 1 wherein the rate-control mechanism further includes a run-length encoding (RLE) mechanism.

3. The modem relay connection system of claim 1 wherein the rate-control mechanism further includes a packet slip mechanism.

4. The modem relay connection system of claim 1 wherein the rate-control mechanism further includes a character size auto-detection mechanism.

5. The modem relay connection system of claim 1 wherein the rate-control mechanism further includes a leaky-bucket mechanism.

6. A modem relay connection system wherein only one of two modem terminal devices does not use a V.42 link layer protocol to communicate data, the system comprising:
   a transport mechanism for transporting a data stream in the modem relay connection, said transport mechanism utilizing either a specified V.14 raw mode or a specified V.14 character mode; and
   said transport mechanism including a rate-control mechanism for speed-matching an end-to-end flow of data within the data stream, the rate-control mechanism including the following functional blocks:
   an effective data rate (EDR) calculator to calculate a transmit rate for a selected stream independently of predetermined non-content information including format and frame information of the selected stream; and
   a speed shift mechanism to identify a rate used for transmitting the selected stream according to an output of the EDR calculator.

7. A modem relay connection system wherein neither of two modem terminal devices uses a V.42 link layer protocol to communicate data, the system comprising:
   a transport mechanism for transporting a data stream in the modem relay connection, wherein the data stream is associated with a V.14 or synchronous modem, said transport mechanism utilizing a specified V.14 raw mode; and
   said transport mechanism including a rate-control mechanism for speed-matching an end-to-end flow of data within the data stream, the rate-control mechanism including the following functional blocks:
   an effective data rate (EDR) calculator to calculate a transmit rate for a selected stream independently of predetermined non-content information including format and frame information of the selected stream; and
   a speed shift mechanism to identify a rate used for transmitting the selected stream according to an output of the EDR calculator;
   wherein said rate-control mechanism includes an auto-detection mechanism for determining character size to enable extraction and packing of characters into modem relay packets, the auto-detection mechanism including a statistical weighting and decision-making logic.

8. A modem relay connection system wherein neither of two modem terminal devices uses a V.42 link layer protocol to communicate data, the system comprising:
   a transport mechanism for transporting a data stream in the modem relay connection, wherein the data stream is associated with a V.14 or synchronous modem, said transport mechanism utilizing a specified V.14 raw mode;
   said transport mechanism including a sequenced unreliable transport; and
   said transport mechanism further including a rate-control mechanism for speed-matching an end-to-end flow of data within the data stream, the rate-control mechanism including the following functional blocks:
   an effective data rate (EDR) calculator to calculate a transmit rate for a selected stream independently of predetermined non-content information including format and frame information of the selected stream; and
   a speed shift mechanism to identify a rate used for transmitting the selected stream according to an output of the EDR calculator;
   wherein said rate-control mechanism includes a lossless compression mechanism for encoding a data bit stream into modem relay packets.

9. A rate-control method for speed-matching an end-to-end flow of data within a data stream in a modem relay connection, the method comprising:
   negotiating effective data transfer rates for exchanging communications between two V.14 or synchronous modem terminal devices of the modem relay connection and respectively associated gateways using inter-gateway messaging;
   wherein said negotiating includes equalizing the effective data transfer rates between the two V.14 or synchronous modem terminal devices and their respectively associated gateways to produce identical effective data transfer rates between the two V.14 or synchronous modem terminal devices and their respective associated gateways, and wherein the negotiated effective data transfer rates refer to data signaling rates with format and frame information removed from the data stream, such that the negotiated effective data transfer rates are different from physical data transfer rates; and the modem relay connection utilizing a non-error correction mode of operation based on the V.14 specification.

10. The method of claim 9, wherein the physical data transfer rates between the two V.14 or synchronous modem terminal devices and their respective associated gateways in the modem relay connection are identical.

11. The method of claim 9, wherein the data stream is associated with a V.14 or synchronous modem.

12. A packet-slip method for use at a V.42 modem-associated gateway linked to a V.14 modem-associated gateway in a modem relay connection, the method comprising:

upon detection at the V.42 modem-associated gateway of a data packet loss during a sequence of serial data packet transmission, transmitting from the V.42 modem-associated gateway a later packet of the sequence instead of retransmitting a lost packet of the sequence, the sequence number of the later packet of the sequence being replaced with the sequence number representing the lost packet of the sequence, thereby maintaining the data flow from the V.42 modem-associated gateway to the V.14 modem-associated gateway.

13. A packet-slip method for use at a V.42 modem-associated gateway linked to a V.14 modem-associated gateway in a modem relay connection, the method comprising:

upon detection at the V.42 modem-associated gateway of a data packet loss during a sequence of serial data packet transmission, transmitting from the V.42 modem-associated gateway a later packet of the sequence instead of retransmitting a lost packet of the sequence, the sequence number of the later packet of the sequence being replaced with the sequence number representing the lost packet of the sequence, thereby maintaining the data flow from the V.14 modem-associated gateway to the V.42 modem-associated gateway.

14. The packet slip method of claim 13 wherein the later packet of the sequence is the next of the sequence in the sequence not yet transmitted by the V.42 modem-associated gateway.

15. A computer-readable medium containing computer executable instructions executable at a V.42 modem-associated gateway linked to a V.14 modem-associated gateway in a modem relay connection, the computer executable instructions, when executed, operable to:

upon detection at the V.42 modem-associated gateway of a data packet loss during a sequence of serial data packet transmission, transmitting from the V.42 modem-associated gateway a later packet of the sequence instead of retransmitting a lost packet of the sequence, the sequence number of the later packet of the sequence being replaced with the sequence number representing the lost packet of the sequence, thereby maintaining the data flow from the V.14 modem-associated gateway to the V.42 modem-associated gateway.

16. A computer-readable medium containing computer executable instructions executable at a V.42 modem-associated gateway linked to a V.14 modem-associated gateway in a modem relay connection, the computer executable instructions, when executed, operable to:

upon detection at the V.42 modem-associated gateway of a data packet loss during a sequence of serial data packet transmission, transmitting from the V.42 modem-associated gateway a later packet of the sequence instead of retransmitting a lost packet of the sequence, the sequence number of the later packet of the sequence being replaced with the sequence number representing the lost packet of the sequence, thereby maintaining the data flow from the V.14 modem-associated gateway to the V.42 modem-associated gateway.

17. The computer readable medium of claim 16 wherein the later packet is the next of the sequence of data packets in the sequence not yet transmitted by the V.42 modem-associated gateway.

18. A modem relay connection system wherein at least one of two modem terminal devices does not use a V.42 link layer protocol to communicate data, the system comprising:

means for transporting a data stream in a modem relay connection, said means for transporting utilizing either a specified raw mode or a specified character mode, wherein the data stream is associated with a V.14 or synchronous modem;

said means for transporting including a sequenced unreliable transport; and said means for transporting further including rate-control means for speed matching an end-to-end flow of data within the data stream in the modem relay connection, the rate-control means including:

an effective data rate (EDR) calculator to calculate a transmit rate for a selected stream independently of predetermined non-content information including format and frame information of the selected stream; and a speed shift mechanism to identify a rate used for transmitting the selected stream according to an output of the EDR calculator.

19. The system of claim 18 in which only one of the two modem terminal devices does not use the V.42 link layer protocol.

20. The system of claim 18 in which neither of the two modem terminal devices uses the V.42 link layer protocol and in which the specified raw mode is used by the two modem terminal devices, wherein said rate-control means includes means for lossless encoding of a data bit stream into modem relay packets.

21. The modem relay connection system of claim 18 wherein the rate-control means further includes a mechanism to determine whether to signal receive not ready.

22. The modem relay connection system of claim 21 wherein the rate-control means further includes a packet slip mechanism.

23. The modem relay connection system of claim 21 wherein the rate-control means further includes a run-length encoding (RLE) mechanism.

24. A modem relay connection system wherein only one of two modem terminal devices does not use a V.42 link layer protocol to communicate data, the system comprising:

means for transporting a data stream in a modem relay connection, said means for transporting utilizing either a specified raw mode or a specified character mode, wherein the data stream is associated with a V.14 or synchronous modem;

said means for transporting including a sequenced unreliable transport; and said means for transporting further including rate-control means for speed matching an end-to-end flow of data within the data stream in the modem relay connection, the rate-control means including the following functional blocks:

an effective data rate (EDR) calculator to calculate a transmit rate for a selected stream independently of predetermined non-content information including format and frame information of the selected stream; and a speed shift mechanism to identify a rate used for transmitting the selected stream according to an output of the EDR calculator;

wherein said rate-control means between one of the two modem terminal devices that uses a V.42 link layer protocol and an associated gateway includes the selective use by the associated gateway of receive not ready (RNR) to control data flow as needed.

25. A modem relay connection system wherein neither of two modem terminal devices uses a V.42 link layer protocol to communicate data, the system comprising:

means for transporting a data stream in the modem relay connection, said means for transporting utilizing a specified character mode by the two modem terminal devices, wherein the data stream is associated with a V.14 or synchronous modem;

said means for transporting including a sequenced unreliable transport; and said means for transporting further including rate-control means for speed matching an end-to-end flow of data within the data stream in the modem relay connection, the rate-control means including the following functional blocks:

an effective data rate (EDR) calculator to calculate a transmit rate for a selected stream independently of predetermined non-content information including format and frame information of the selected stream; and a speed shift mechanism to identify a rate used for transmitting the selected stream according to an output of the EDR calculator;

wherein said rate-control means includes an auto-detection means for determining character size to enable extraction and packing of characters into modem relay packets, the auto-detection means using a statistical weighting and decision-making logic.

* * * * *